United States Patent [19]
Fasce

[11] Patent Number: 5,121,654
[45] Date of Patent: Jun. 16, 1992

[54] PROPULSION AND TRANSMISSION MECHANISM FOR BICYCLES, SIMILAR VEHICLES AND EXERCISE APPARATUS

[75] Inventor: Hector G. Fasce, 1603 Bedworth Rd., Luthervill, Md. 21093

[73] Assignee: Hector G. Fasce, Gaithersburg, Md.

[21] Appl. No.: 581,826

[22] Filed: Sep. 4, 1990

[51] Int. Cl.$^5$ .............................. G05G 1/14; B62M 1/12
[52] U.S. Cl. ................... 74/594.2; 74/594.1; 280/255; 280/234; 384/545
[58] Field of Search .............. 74/594.1, 594.2; 272/70, 73; 280/234, 255, 256, 258, 259; 474/140, 208; 384/551, 545

[56] References Cited

U.S. PATENT DOCUMENTS

| 349,395 | 5/1805 | Totey | 384/545 |
|---|---|---|---|
| 517,697 | 4/1894 | Hyde | 280/234 |
| 563,729 | 7/1896 | Barnes, Sr. et al. | 74/594.2 |
| 582,530 | 5/1897 | Hyatt | 74/594.2 |
| 3,081,645 | 3/1963 | Bergfors | 74/594.1 |
| 3,922,929 | 12/1975 | Marchello | 74/594.1 X |
| 4,124,222 | 11/1978 | Moe et al. | 280/255 X |
| 4,550,906 | 11/1985 | Im | 74/594.2 X |
| 4,574,649 | 3/1986 | Seol | 74/594.1 X |
| 4,616,840 | 10/1986 | Green | 280/234 |
| 4,796,907 | 1/1989 | Geller | 280/255 X |
| 4,886,287 | 12/1989 | Kranse, II et al. | 272/73 X |
| 4,915,374 | 4/1990 | Watkins | 74/594.1 X |

FOREIGN PATENT DOCUMENTS

| 0100405 | 3/1937 | Austria | 280/258 |
|---|---|---|---|
| 0923517 | 3/1973 | Canada | 272/73 |
| 0297579 | 1/1989 | European Pat. Off. | 280/259 |
| 0656494 | 1/1929 | France | 280/255 |

*Primary Examiner*—Leslie A. Braun
*Assistant Examiner*—Winnie Yip
*Attorney, Agent, or Firm*—Hector G. Fasce

[57] ABSTRACT

Apparatus of dual partially independent mechanism to propel bicycles or other vehicles, having a bottom bracket shell attached to a frame, a pair of main shafts mounted separately in said bottom bracket shell, a pair of propulsion levers supporting operating pedals, a pair of arcs each arc attached to each propulsion lever which is mounted on each main shaft, a pair of chains, each chain hooked with one end portion to one arc, and the other end portion of the chain entrained around one of the two freewheels which are mounted on a wheel hub which is disposed rearwardly of the bottom bracket shell, a pair of springs, each spring hooked from one end portion of a chain to the rear portion of each lever respectively.

5 Claims, 3 Drawing Sheets

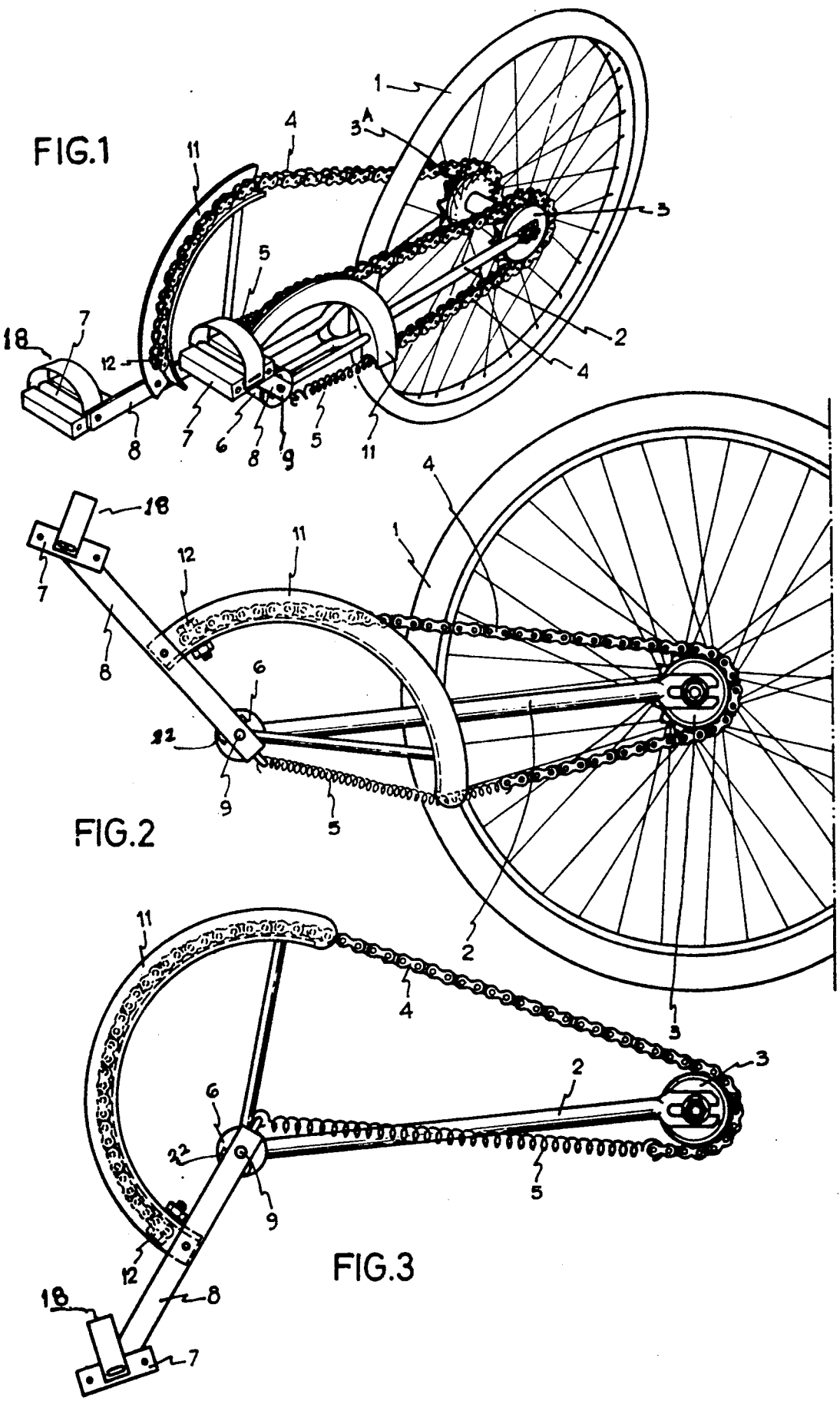

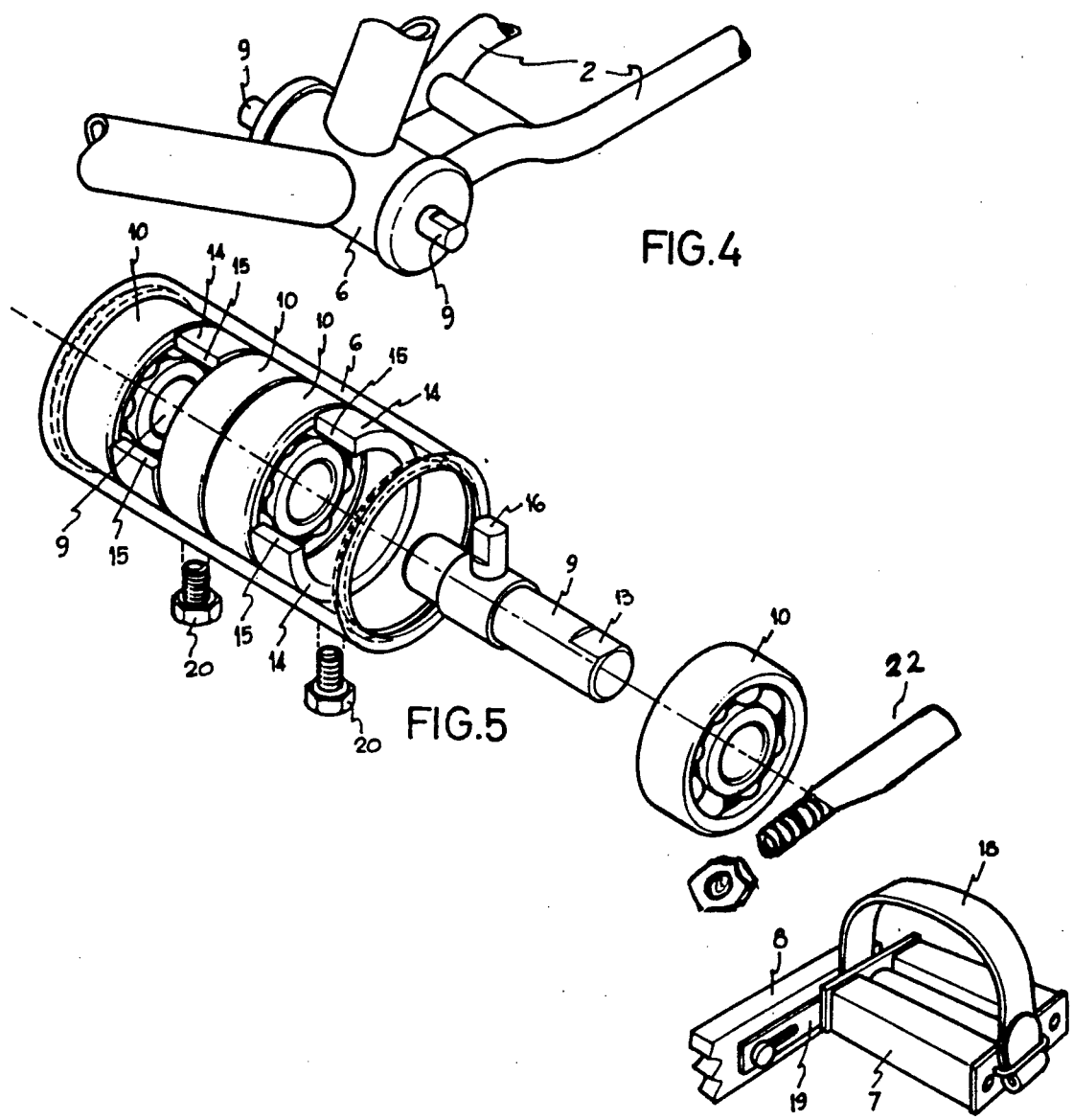
FIG.4
FIG.5
FIG.8
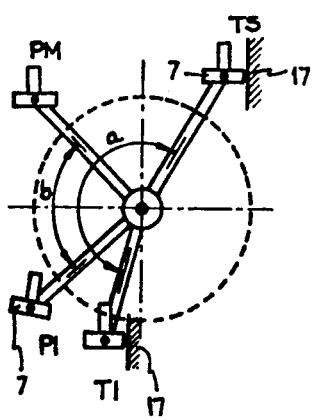
FIG.9

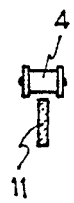 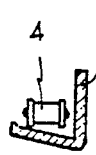  
FIG. 6A    FIG. 6B    FIG. 6C    FIG. 6D
FIG. 6
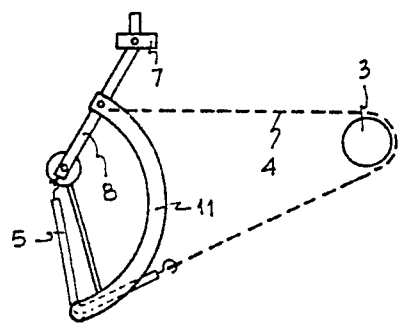 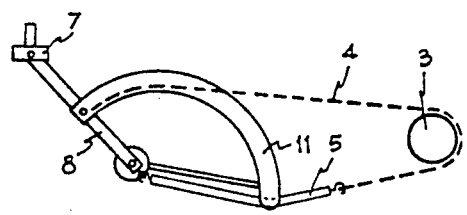
FIG. 10A    FIG. 10    FIG. 10B
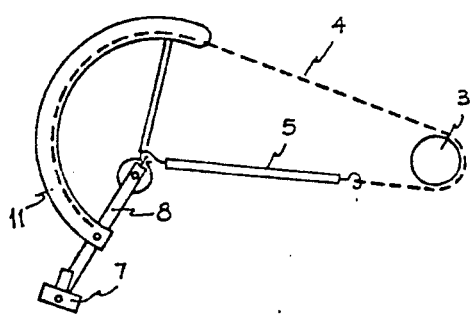 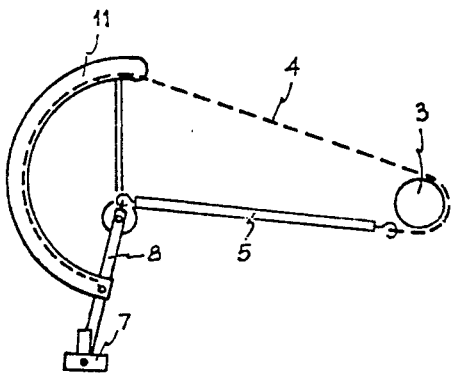
FIG. 10C    FIG. 10D
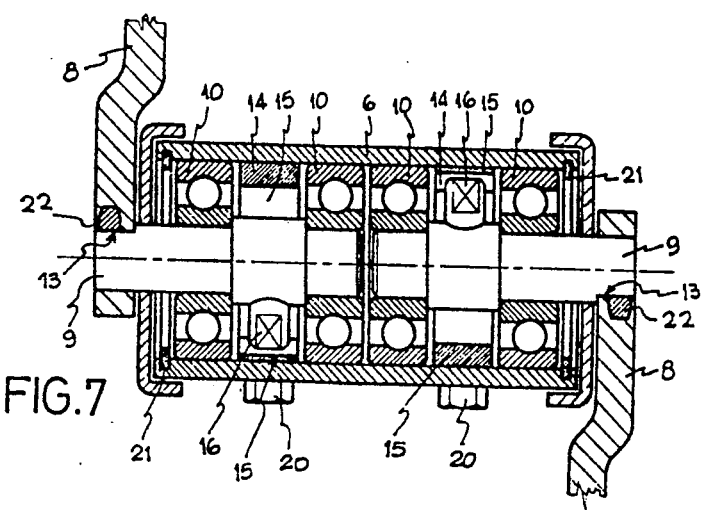
FIG. 7

1

PROPULSION AND TRANSMISSION MECHANISM FOR BICYCLES, SIMILAR VEHICLES AND EXERCISE APPARATUS

BACKGROUND OF THE INVENTION

This invention is especially suitable for use in a bicycle which can be propelled by transmitting force imparted from the up and downward motion of propulsion levers with arcs to the rear wheel through the chains and freewheels.

Conventional bicycles are mostly driven by the circular motion of crank pedals. However, only a small portion of the 360 degree is used and the rest is wasted.

Although lever propelled bicycles and similar vehicles propelled by the up and downward motion of propulsion levers have been proposed, the mechanism used for transmitting the motion energy of the propulsion levers to the rear wheel has not been satisfactory.

SUMMARY

It is the object of this invention to improve the propulsion and transmission mechanism, as well to improve the way of using abdominal and other muscles by lifting up and pushing downward on the pedals using one leg at a time or both legs at the same time, to add power with less effort. The invention overcomes the inherent inefficiency in conventional circular pedaling, delivering more effective power transfer, due to the eccentric and variable curvature of the arcs made to develop maximum power and efficiency of each muscle according to the muscle power used at that part of the pedaling motion. Due to the infinite positions and ways of pedaling with the mechanism invented, only a few examples are explained. The right side of the mechanism is independent of the left side of the mechanism, pedaling with one leg at a time or both at the same time in parallel or not, lifting one leg while resting the other, or resting both legs at the extreme point up or downward. Approximately at ¼ of a turn from the departure point of any one of the pedals, the rider can propel more power due to the legs positions and the relation from the main shafts to the arc's radius and to the freewheel, and consequently to the propelling wheel (see FIG. 10 B wheel not shown).

These advantages are the result of the particular dual mechanism invented which is composed of a pair of independent main shafts, each one with a lateral jut conveniently seated into a pair of bearings and between said bearings a half piece of a ring (semi circle) bolted into the bottom bracket shell. Consequently, the semicircle pieces and the shaft lateral juts serve to stop the pedals motion at the terminal points. Said parts are assembled in the bottom bracket shell, which is attached to a frame and the saddle mounted on the frame. A pair of levers, each lever with an arc attached and cottered to each said main shaft. A pair of chains, each chain h oked and sitting on each arc rail, are connected separately to a pair of freewheels (one way clutches) mounted to a rear hub. A pair of springs each one separately hooked to each chain end portion respectively, and the other end of each spring hooked to the rear portion of the correspondant lever.

According to this mechanism, when the rider sits on the saddle and puts his feet on the right and left pedals, and pushes downward on any of the pedals, moving the lever and arc built in one piece and attached to the main shaft therefore pulling the chain from and on the arc, said chain is entrained around the freewheel and spins the hub, consequently propelling the rear wheel, the spring connecting the chain to the lever keeps the chain tensioned and enables the fast upward return of the pedal. When the foot is removed and the pedal is released, the rear end of the arc sits on said spring to hold the pedal in a neutral position that is about ¼ from the terminal position. The pedal which is fastened to the lever, has a rubber band from the pedal to the lever holding it in position to insert the foot easily between the pedal and a adjustable strap. Obviously as previously described in this case, there are two partially independent mechanisms due to that a bicycle only has one propelling wheel.

DESCRIPTION OF THE DRAWINGS

The following are drawings descriptions, however they should only be viewed as examples not limitations of the invention.

FIG. 1 It is a perspective view of a frame portion, a rear wheel of a bicycle and the mechanism in accordance with this invention, the left pedal approximately in neutral point, and the right pedal is only to show the mechanism.

FIG. 2 Is a lateral view of one side mechanism and the same rear wheel of the anterior figure with the pedal in neutro.

FIG. 3 Is a lateral view of one side of the propulsion and transmission mechanism with the chain entrained around the free wheel and the spring fully expanded connecting the chain to the lever rear portion, also showing the pedal at the extreme downward portion.

FIG. 4 Is a view of the frame portion with the bottom bracket shell and the main shafts.

FIG. 5 Is a transparent view of the bottom bracket shell partially assembled.

FIG. 6 are four schematic views of the possible formats of the rail's arc.

FIG. 7 Is a longitudinal and axial cut of the bottom bracket shell showing the interior parts.

FIG. 8 Is a perspective view of one of the pedals fastened to the front portion of one of the levers.

FIG. 9 Diagram showing the more significant operative positions of the pedal motion.

FIG. 10 Are four (A, B, C, D,) schematic illustrations showing some of the pedal positions and mechanism functions.

DESCRIPTION OF THE PREFERRED EMBODIMENTS

The following is a description referring more particularly to the drawings. FIG. 1 the rear of a bicycle illustrating the rear wheel 1 the rear frame portion 2 built in one piece with the bottom bracket shell 6. The propulsion levers 8, each one built in one piece with each arc 11 and attached to each shaft 9. A pair of pedals 7 each one fastened to each lever 8, said pedals 7 each one with an adjustable strap 18 to hold the feet onto the pedals 7. Two chains 4, each one hooked to an eye bolted 12 to each arc 11 and each chain separately sitting on each arc rail 11 and entrained around the freewheels 3 (one way clutch) mounted at both ends of the wheel hub 3A assembled to the propelling wheel 1. A pair of helical extension springs 5, each one connected from each chain end portion 4) to each one of the levers 8 FIG. 2 A side view of the rear wheel 1 and frame portion 2 with the bottom bracket shell 6 and a transparent view showing how the chain 4 is hooked to the eye bolt 2 and sitting on the arc rail 11 and how the arc rail end portion 11 is sitting on the spring 5 to keep the chain 4 tensioned and the pedal 7 in neutral position. FIG. 3 is a side view of the mechanism with the pedal 7 downward at terminal point, and a transparent view of the arc 11 with the chain 4 sitting on the total arc surface 11, also showing the helical spring 5 connected and expanded from the lever rear portion 8 to the chain end portion 4. FIG. 4 A frame portion 2 built in one piece with the bottom bracket shell 6 and the two main shafts portions 9 showing. FIG. 5 Is a inside view of the bottom bracket shell 6 and two semi circle pieces 14 each one sitting inside between each pair of bearings 10 each semi circle piece 14 bolted to the bottom bracket shell 6 and outside is a main shaft 9 with a lateral jut 16 built in one piece and a pin seat 13, a bearing 10 a cotter pin 22 and two bolts 20. FIG. 6 Are four different examples of rails 11 in transversal cuts with chain link 4 on. FIG. 7 Is a longitudinal cut of the bottom bracket shell 6 including in the interior both main shafts 9 with the correspondent lateral juts 16 the four bearings 10 the two semi circle pieces 14 between each pair of bearings 10 and two lock rings 21. FIG. 8 Is a perspective view of one pedal 7 with an adjustable strap 18, and optional rubber band 19 connected from the pedal 7 to the front lever portion 8. FIG. 9 Is a diagram of the more significant positions of the pedals motion 7 at terminal points 17 up TS down TI in arrow (b) showing a portion where more power can be applied from PM to PI, the arrow (a) showing a complete motion from TS to TI at terminal points. FIG. 10 A, B, C, D, are four schematic illustrations showing one side of the mechanism with the pedal 7 in different positions.

I claim:

1. A propulsion and transmission mechanism having a frame built in one piece with a bottom bracket shell, inside said bottom bracket shell having a pair of main shafts, each shaft with a lateral jut built in one piece mounted in a pair of bearings spaced from the other main shaft and another pair of bearings, and between each pair of bearings is a semi circle piece bolted into the bottom bracket shell, a hub mounted at a rear end poriton of said frame disposed rearwardly of the bottom bracket shell, a pair of propulsion having a front end portion levers for receiving pedals with adjustable straps, and a rubber band from pedal to lever, a pair of arcs, each arc built in one piece with each lever attached and fastened with cotter pins to each one of said main shafts, a pair of chains, each chain separately hooked to end portion to each one of said arcs connecting and entrained around each one of two freewheels respectively which are mounted at both ends of said rear wheel hub, a pair of helical springs each spring connected another end portion of said chain to each lever rear portion respectively.

2. The propulsion mechanism according to claim 1 wherein, said pair of arcs, each arc being attached to each propulsion lever, and each arc eccentric from the main shaft, also arc structure has variable curvature.

3. The invention according to claim 1 wherein, said pair of arcs, each arc of variable curvature, and also having a rear end portion providing continuity tension to the chain, and holding the levers at neutral position.

4. The propulsion mechanism according to claim 1 wherein said pair of main shafts, each main shaft having said lateral jut built in one piece providing stop motion against each semi circle piece in the bottom bracket shell respectively.

5. The invention according to claim 1 wherein said pair of levers and said pair of pedals having said rubber band from each lever to each pedal respectively, the hold pedal in position to insert foot.

* * * * *